INVENTOR.
Wladimir Albrand
BY Adams + Bush
Attorneys

Patented Apr. 4, 1950

2,502,692

UNITED STATES PATENT OFFICE 2,502,692

REGULATION OF TWO STAGE AUTOMATIC CHARGING OF STORAGE BATTERIES

Wladimir Albrand, Paris, France, assignor to Compagnie General D'Electricite, Paris, France, a French corporation Application June 26, 1947, Serial No. 757,238
In France June 28, 1946

4 Claims. (Cl. 320—24)

My invention relates to an automatically regulated system for charging storage batteries, employing a direct current generator and is an improvement on the system described in my copending application, Ser. No. 700,972, filed October 3, 1946.

My said co-pending application relates to regulating apparatus for the automatic charging of a storage battery in two stages, the first stage being at constant current during a definite period of time determined for a given state of discharge, followed by a second stage at constant voltage, which voltage is equal to that attained by the battery at the end of the first stage of charging, and is particularly characterized by the fact that it comprises a current regulator adjusted to the current value, and a voltage regulator adjusted to a determined value of voltage which is greater than or equal to the said constant voltage of the second stage.

The present invention is characterized by the use of one single regulator which has a control unit having five windings and a rectifier, which acts as a current regulator during the first stage of charge and, thereafter, as a voltage regulator during the second stage of charge, by setting into operation suitable means responding at the end of a given period of time, and provision is made for the damping of transients which may occur in a first one of the windings of the control unit during the transient regulation period, by providing another winding of this control unit which receives, through a path including a condenser, impulses due to the variations of the voltage across the terminals of the separate device provided for effecting the regulation, the first winding being connected in shunt across the charging circuit.

Figure 1:
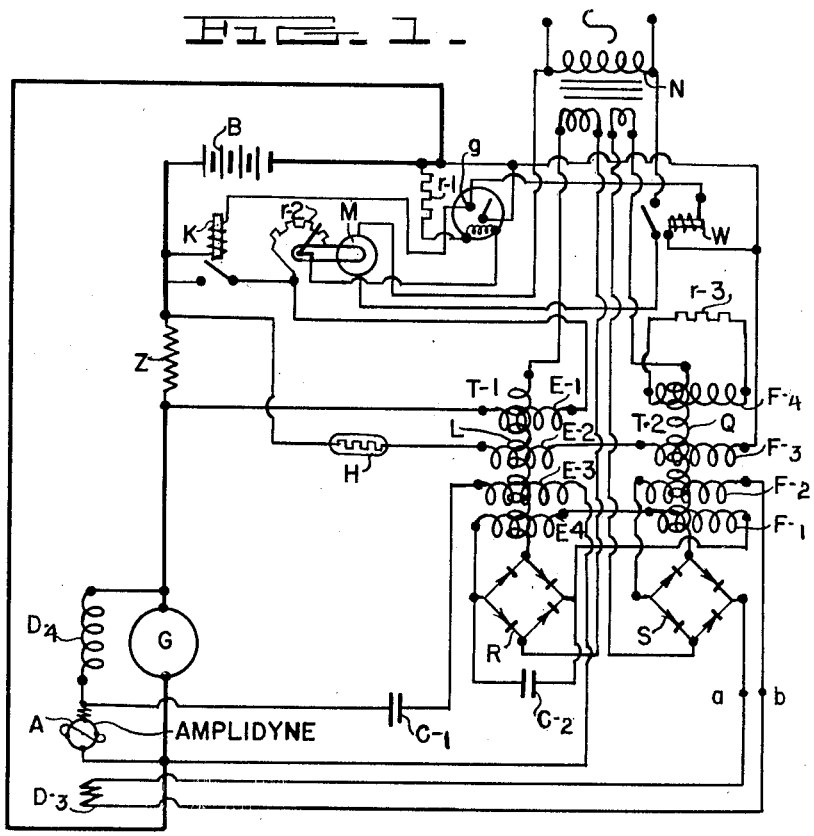
Fig. 1 shows an apparatus of the type described, the regulating device of which is such a control unit, and the device which actually produces the regulation being an amplidyne generator.

As shown in Fig. 1, a principal reactor may be used as a sensitive regulating device, and the device which actually carries out the regulation is here an amplidyne type of generator A arranged as a step-up device for the exciting winding of the charging generator G which is to charge storage battery B.

The amplidyne is a dynamo-electric amplifier device consisting of an armature excited generator having four brushes, of which two opposite brushes are short-circuited as described by Alexanderson, General Electric Review, March 1940, the Alexanderson U. S. Patent No. 2,227,992, and the Thomas U. S. Patent No. 2,454,581.

The regulator itself, properly so designated, is composed (Fig. 1) of a control unit or reactor $T_1$ having four direct current windings $E_1$, $E_2$, $E_3$, $E_4$, an alternating current winding L, and a rectifier R connected in series with the alternating current winding L of the reactor $T_1$. The several windings of reactor $T_1$ are in mutual inductive relation.

The first winding $E_1$ is traversed by a current proportional to the charging current $i$ when the electro-magnetic switch K is closed, and proportional to the battery terminal voltage when switch K is open.

The second winding $E_2$ is traversed by a constant current, for example, as shown in Fig. 1, a current tapped off across the terminals of the battery B and regulated by a ballast tube H.

The third winding $E_3$ is connected to the terminals of the amplidyne generator A through a condenser $C_1$, and receives an impulse each time the voltage across the terminals of the amplidyne generator A has a sudden variation of voltage. The polarity of the third winding $E_3$ is such that the impulse received opposes the rapid variation of the flux generated by the current of the first winding $E_1$. During the stable period of operation, the action of this winding is neutralized or stabilized by the arrangement described below.

The fourth winding $E_4$ is traversed by the current delivered by the rectifier R.

The current delivered by the rectifier R is amplified by the amplifier constituted by the auxiliary reactor control unit $T_2$ and the rectifier S in series with the alternating current winding Q of the auxiliary control unit $T_2$.

The auxiliary control unit $T_2$ comprises four direct current windings $F_1$, $F_2$, $F_3$, $F_4$, and the alternating current winding Q.

The first winding $F_1$ is traversed by the current delivered by the rectifier R of the principal control unit, which also traverses the winding $E_4$.

The third winding $F_3$ is traversed by a constant current, the same as that which traverses winding $E_2$, for example. The second winding $F_2$ is arranged in series with the control winding $D_3$ of the amplidyne generator A and is traversed by the current delivered by the rectifier S.

The fourth winding $F_4$ is short circuited by a resistance of suitable value $r_3$. The assembly consisting of the fourth winding $E_4$ and the condenser $C_2$ which is connected to the direct current terminals of rectifier R, taken together with winding $E_3$ and condenser $C_1$ constitutes the neutralization arrangement above mentioned which automatically neutralizes all the oscillating conditions which may arise in the closed circuit which includes the charging generator G and the windings of control unit or reactor $T_1$. These two devices are coupled together, on the one side by the resistor Z which is traversed by the charging current during the first charging stage, or by the voltage of the battery B during the second charging stage, and on the other side by the flux due to the current traversing the exciting winding $D_3$ of amplidyne A, this latter current being delivered by the control unit or reactor $T_1$.

The control units or reactors $T_1$ and $T_2$ are each preferably of the saturable core type of direct current excited inductive reactor, composed of the several windings as shown, wound on a closed three-leg type of laminated iron transformer core frame and preferably having the alternating current winding as L of $T_1$ split and wound on the two outer legs, and the several direct current windings wound on the middle leg.

Fig. 1 also shows the following devices whose operation was described in detail in my said copending application above identified and the purpose of which is briefly mentioned here:

An additional fixed resistance $r_1$ in series with the winding of the contact galvanometer $g$, and also in series with a resistance $r_2$ having a sliding contact $c$. The sliding contact $c$ is driven by a servo motor M operated by a clockwork mechanism or ampere-hour meter. The contact of the galvanometer closes at the moment at which the value of the resistance $r_2$ is such that it corsponds to the determined voltage $U'_0$, which is equal to or greater than the constant value of the voltage of the second stage of the charging operation. The resistance $z$ is inserted in series in the charging output line of generator G leading to storage battery B, between the points from which are tapped the windings $E_1$ and $E_2$.

The stopping of the servo motor M having been effected by an electro-magnetic switch W which is energized when the galvanometer contact $q$ is closed, this same contact causes the opening of the electro-magnetic switch K for the purpose of changing the system from the first charging stage to the second charging stage.

Figure 2:
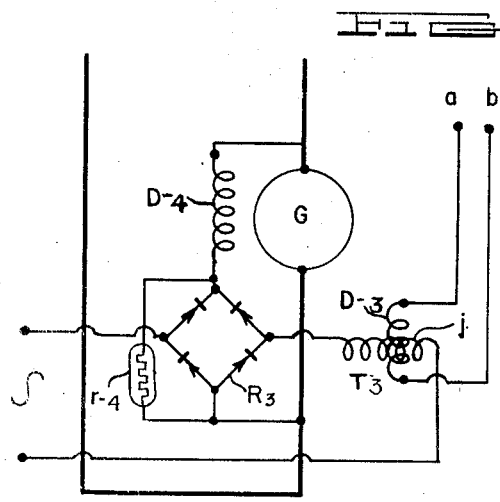
Fig. 2 shows for a modified form of the system of Fig. 1, the portion of the system including the generator and the regulation device, the employment of a bridge rectifier instead of an amplidyne generator, as in Fig. 1.

Fig. 2 shows a modification of the portion of the system including the generator, wherein a rectifier bridge or dry rectifier, or other type of rectifier has been substituted for the amplidyne generator A. In the arrangement shown in Fig. 2, the output terminals $a$, $b$ of the unit including $T_2$ and S are connected to the direct current winding $D_3$ of the reactor unit $T_3$, the alternating current winding $j$ of the reactor $T_3$ being connected in series with the rectifier $R_3$.

In order to reduce the dimensions of the reactor $T_3$, the rectifier is shunted by a resistance $r_4$, the value of which increases with the voltage applied to its terminals, such as an iron-hydrogen resistance, for example.

The above described apparatus operates as follows:

At the beginning of the charging of the battery B, the magnitude of the charging current is maintained constant by the control unit or reactor $T_1$ connected at this time across the terminals of resistor Z. The switch K is closed. At the end of an interval of time $T_0$ determined for a given state of charge, the servo motor M is started up, driving on its shaft the sliding contact of the variable resistor $R_2$. This sliding contact will stop only upon attaining a determined voltage $U_0$, applied by the galvanometer $g$ and equal to the sum of $U_0$ (voltage of the battery B) and the voltage across the terminals of the resistor $r_2$.

At this instant, the switch K opens. The control unit or reactor $T_1$ being thereafter connected across the terminals of the battery, operates as the voltage regulator and maintains the charging current at a magnitude such that the voltage of the battery remains constant and equal to $U_0$. The magnitude of the current thus thereafter decreases progressively up to the end of the charging operation.

Thus, the transductor $T_1$ with the rectifier R constitutes the regulator properly so designated.

The transductor $T_1$ comprises a winding $E_2$ which is traversed by a constant continuous current which develops a constant flux. Upon this flux there is superposed a flux developed in the winding $E_1$ which is proportional to the value of the value to be measured; that is to the magnitude of the charging current when the switch K is closed, and to the voltage of the battery when switch K is open.

The resulting flux of the windings $E_2$ and $E_1$ acts in such manner that when the magnitude of the quantity to be measured increases in value, the current delivered by the rectifier R diminishes.

The action of the differential flux on the value of the self-inductance of the transductor $T_1$ can be increased by adding a third continuous current winding $E_4$, called the reaction winding, and which acts in the same manner as a series winding of a direct current generator.

The fourth winding $E_3$ of transductor $T_1$ is connected on the reactor $T_1$. As is seen in Fig. 1, the winding $E_3$ is connected through a condenser $C_1$ to the terminals of the amplidyne A. This winding $E_3$ is traversed by a current only when the voltage across the terminals of the amplidyne A varies abruptly, this variation being due, for example, to a sudden variation of the supply voltage, or at the moment of being put into service it may be due to the sudden variation of the battery voltage. The winding $E_3$ is connected in such manner that the flux which it develops shall be in opposition to the flux due to the winding $E_1$.

It follows that very abrupt variation of the output of rectifier R, which could cause oscillations of the regulator device, which in the present case is the amplidyne A, is prevented. Thus, there is attained a device which produces results similar to a mechanical dash-pot.

The voltage across the terminals of the amplidyne A, even during a stable period, is not a rigorously continuous voltage, its exciting winding $D_3$ being energized by a rectified current. Consequently, the winding $E_3$ is traversed in a permanent manner by an alternating current which affects the operation of the reactor $T_1$. Experience has shown that a condenser $C_2$ shunted across the terminals of the rectifier R substantially diminishes this troublesome effect.

The current which is delivered from the rectifier R may be of insufficient magnitude to excite the amplidyne A. In this case, it is necessary to amplify this current, which is done by the assembly consisting of the reactor $T_2$ and the rectifier S.

Here, as in the reactor $T_1$, the variations of the current of the rectifier S, have their origins in the variation of the differential developed by the windings $F_1$ and $F_3$. Their action is likewise reinforced by the winding $F_2$.

It is to be remarked that the alternating current transmitted by the condenser $C_1$ induces an electromotive force in the winding $E_3$ which is on the same core as the winding $E_4$. In order to neutralize this alternating component, a fourth winding $F_4$ is applied on the reactor $T_2$. This winding is short-circuited by a resistance $r_3$ and acts as a de-magnetizing winding with reference to the alternating component of the flux.

It will be apparent to those skilled in the art that my invention is susceptible of modification to adapt the same to particular applications, and all such modifications which are covered by the appended claims I consider to be comprehended within the scope of my invention.

What is claimed is:

1. In a system for regulating the charging of storage batteries, a storage battery, a direct current generator having a field winding, constant output regulating means connected to said generator field to maintain constant the output of said generator, a charging circuit connecting said generator to said battery, a first control unit comprising an alternating current winding and four direct current windings and a first rectifier, circuit means for deriving from said charging circuit a voltage proportional to the charging current flowing therein and applying the same to a first direct current winding of said first control unit, switch means comprised in said circuit means and connected and adapted when actuated to cause the said voltage applied to said first direct current winding to be proportional to the terminal voltage across said storage battery instead of to said charging current, a second direct current winding of said first control unit being connected across said battery terminals, time control means for actuating said switch means at the termination of a predetermined period of time, a damping circuit comprising a condenser connected between said regulating means and a third direct current winding of said first control unit, said first rectifier having its alternating current terminals connected to said alternating current winding of said control unit and its direct current terminals connected to a fourth direct current winding of said first control unit, and an auxiliary control unit having an alternating current winding and four direct current windings and a second rectifier, one of said direct current windings of said auxiliary control unit being inserted in series in the connections of said fourth direct current winding of said first control unit, a second one of said direct current windings of said auxiliary control unit being connected in series with the direct current terminals of said second rectifier and a control winding of said regulating means, and a third direct current winding of said control unit being inserted in series with said second direct current winding of said first control unit.

2. A system according to claim 1, said regulating means being an amplidyne having a control winding.

3. A system according to claim 1, said regulating means being a bridge rectifier and an additional reactor control unit having an alternating current winding and a direct current winding, said alternating current winding being connected to an alternating current terminal of said bridge rectifier, and said control winding of said regulating means being said direct current winding of said additional control unit.

4. A system according to claim 1, said time control means comprising a contact galvanometer and a motor driven continuously variable resistor connected in series with the actuating winding of said galvanometer, a motor for driving said resistor, and the controlled contacts of said galvanometer being connected to an actuating winding controlling said switch means, and auxiliary switch means inserted in the supply circuit of said motor and connected to be actuated to open position when the contacts of said galvanometer are closed.

WLADIMIR ALBRAND.

REFERENCES CITED

The following references are of record in the file of this patent:

UNITED STATES PATENTS

| Number | Name | Date |
|---|---|---|
| 1,008,243 | Creveling | Nov. 7, 1911 |
| 1,008,244 | Creveling | Nov. 7, 1911 |
| 1,008,294 | Creveling | Nov. 7, 1911 |
| 1,246,855 | Bliss | Nov. 20, 1917 |
| 1,868,046 | Cole | July 19, 1932 |
| 1,964,246 | Benit | June 26, 1934 |
| 2,227,992 | Alexanderson | Jan. 7, 1941 |
| 2,454,581 | Thomas | Nov. 23, 1948 |

OTHER REFERENCES

Alexanderson, General Electric Review, March 1940.